United States Patent
Gong et al.

(10) Patent No.: US 9,959,069 B2
(45) Date of Patent: May 1, 2018

(54) EXTERNALIZED EXECUTION OF INPUT METHOD EDITOR

(71) Applicant: Microsoft Technology Licensing, LLC, Redmond, WA (US)

(72) Inventors: Xin Gong, Issaquah, WA (US); Daniel Chang, Redmond, WA (US); Sameer Garde, Redmond, WA (US); Drew Elliott Linerud, Duvall, WA (US); Eric Norman Badger, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 18 days.

(21) Appl. No.: 14/825,095

(22) Filed: Aug. 12, 2015

(65) Prior Publication Data

US 2016/0239237 A1 Aug. 18, 2016

Related U.S. Application Data

(60) Provisional application No. 62/115,585, filed on Feb. 12, 2015.

(51) Int. Cl.
*G06F 3/06* (2006.01)
*G06F 17/24* (2006.01)
*G06F 9/54* (2006.01)

(52) U.S. Cl.
CPC .......... *G06F 3/0638* (2013.01); *G06F 3/0619* (2013.01); *G06F 3/0683* (2013.01); *G06F 9/544* (2013.01); *G06F 17/24* (2013.01)

(58) Field of Classification Search
CPC ........ G06F 3/0619; G06F 8/65; G06F 3/0683; G06F 3/0656; G06F 3/0643; G06F 8/71; G06F 9/544; G06F 11/1446; G06F 17/30067; G06F 17/30091; G06F 17/24; G06F 3/0638

See application file for complete search history.

(56) References Cited

U.S. PATENT DOCUMENTS 7,437,598 B2 * 10/2008 Zohar ................. G06F 11/2058
714/6.23
8,065,275 B2 11/2011 Eriksen et al.
(Continued)

FOREIGN PATENT DOCUMENTS

WO 2013032137 A2 3/2013

OTHER PUBLICATIONS

International Search Report and Written Opinion Issued in PCT Application No. PCT/US2016/016238, dated May 19, 2016, 12 Pages.
(Continued)

*Primary Examiner* — Hashem Farrokh
(74) *Attorney, Agent, or Firm* — Fountainhead Law Group P.C.

(57) ABSTRACT

A facility for processing textual input generated with a user input device described. In one example facility, the facility stores the textual input in a first data structure contained in the address space of a first process. The facility synchronizes contents of the first data structure to a second data structure contained in the address space of a second process distinct from the first process, an application executing in the second process being configured to consume textual input synchronized to the second data structure.

18 Claims, 7 Drawing Sheets

(56) References Cited

U.S. PATENT DOCUMENTS

| | | | |
|---|---|---|---|
| 8,161,370 B2 | 4/2012 | Nguyen | |
| 8,176,233 B1* | 5/2012 | Karamcheti | G06F 12/06 |
| | | | 710/56 |
| 8,495,250 B2 | 7/2013 | Ananthanarayanan et al. | |
| 8,788,760 B2 | 7/2014 | DeCusatis et al. | |
| 8,799,311 B2 | 8/2014 | Powell et al. | |
| 8,806,325 B2 | 8/2014 | Decker et al. | |
| 8,812,651 B1 | 8/2014 | Eriksen et al. | |
| 8,832,288 B1 | 9/2014 | Mahkovec et al. | |
| 2003/0110472 A1* | 6/2003 | Alloing | G06F 8/71 |
| | | | 717/122 |
| 2005/0066059 A1* | 3/2005 | Zybura | H04L 29/06 |
| | | | 709/248 |
| 2005/0125618 A1* | 6/2005 | Arakawa | G06F 11/2058 |
| | | | 711/162 |
| 2006/0026154 A1 | 2/2006 | Altinel et al. | |
| 2009/0049243 A1 | 2/2009 | Dubrovsky et al. | |
| 2009/0216690 A1 | 8/2009 | Badger et al. | |
| 2011/0078246 A1 | 3/2011 | Dittmer-Roche | |
| 2012/0246563 A1 | 9/2012 | Nusbaum | |
| 2013/0151940 A1 | 6/2013 | Bailor et al. | |
| 2014/0082473 A1* | 3/2014 | Sitrick | G06F 17/24 |
| | | | 715/230 |
| 2015/0032967 A1 | 1/2015 | Udayashankar et al. | |
| 2016/0078245 A1* | 3/2016 | Amarendran | G06F 21/6218 |
| | | | 713/193 |
| 2016/0162374 A1* | 6/2016 | Mutha | G06F 3/06 |
| | | | 714/19 |

OTHER PUBLICATIONS

Eshel, et al., "Panache: A Parallel File System Cache for Global File Access," In Proceedings of the 8th USENIX Conference on File and Storage Technologies, Feb. 23, 2010, 14 pages.

Scheuermann, et al., "A Case for Delay-Conscious Caching of Web Documents," In Journal of Computer Networks and ISDN Systems, vol. 29, Issue 8-13, Sep. 1997, 11 pages.

De, et al., "Caching Techniques for Rapid Provisioning of Virtual Servers in Cloud Environment," In Proceedings of IEEE Network Operations and Management Symposium, Apr. 16, 2012, pp. 562-565.

"International Preliminary Report on Patentability Issued in PCT Application No. PCT/US2016/016238", dated May 15, 2017, 7 Pages.

"Second Written Opinion Issued in PCT Application No. PCT/US2016/016238", dated Feb. 2, 2017, 6 Pages.

* cited by examiner

EXTERNALIZED EXECUTION OF INPUT METHOD EDITOR

CROSS-REFERENCE TO RELATED APPLICATION(S)

This application claims the benefit of U.S. Provisional Application No. 62/115,585, filed on Feb. 12, 2015, which is hereby incorporated by reference in its entirety. In cases in which a document incorporated by reference herein is inconsistent with contents of this application, the contents of this application control.

BACKGROUND

An Input Method Editor, or "IME," is a program that transforms user input events into user-specified text for consumption by an application, such as for augmenting a document edited by the application. For example, an on-screen keyboard that performs shape writing, automatic word completion, word prediction, or ideographic character composition can be implemented as an IME, as can an automatic speech transcription mechanism.

Where a user selects a particular IME for use with an application, the operating system typically causes the IME to be loaded into the application's process and executed there. The IME stores the text that it generates in the document within the address space of the application's process. A lock or other synchronization mechanism is used to prevent the application and the IME from writing to the document at the same time, which could result in corruption of the document.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for processing textual input generated with a user input device described. In one example facility, the facility stores the textual input in a first data structure contained in the address space of a first process. The facility synchronizes contents of the first data structure to a second data structure contained in the address space of a second process distinct from the first process, an application executing in the second process being configured to consume textual input synchronized to the second data structure.

DETAILED DESCRIPTION

Figure 1:
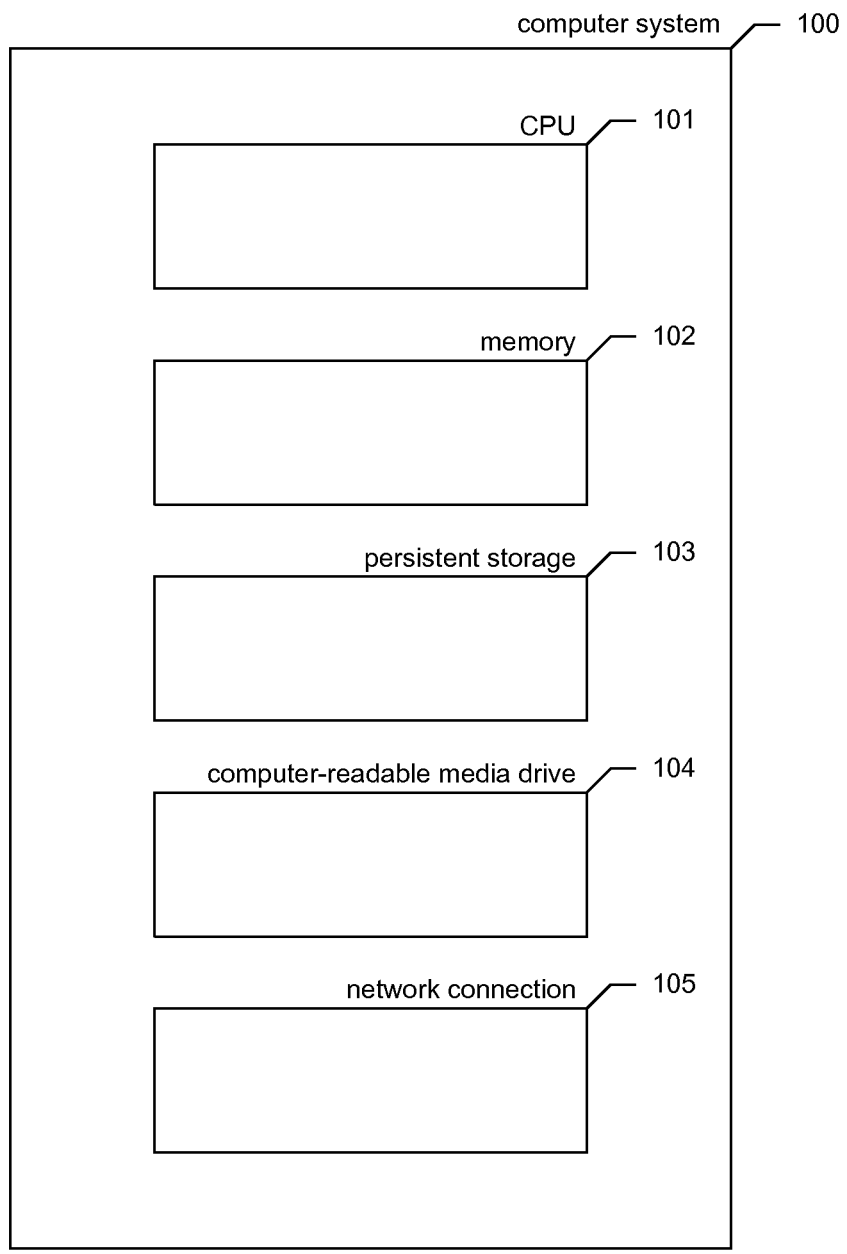
FIG. 1 is a block diagram showing some of the components that may be incorporated in at least some of the computer systems and other devices on which the facility operates.

The inventors have identified significant disadvantages with conventional approaches to executing IMEs. In particular, the inventors recognized that the application process is burdened by its execution of the IME, both by the IME's consumption of the application process's resources, and by the time the application spends blocked on the document's lock.

Also, the inventors have determined that it constitutes a security risk to permit code for the application and code for the IME to execute in the same process, which can permit a fault in the IME to crash the application.

Further, the inventors have recognized that executing IMEs in the same process as the application impairs the ability of the application to execute on a computer system other than the computer system to which user input devices are directly connected.

In order to overcome these disadvantages, the inventors have conceived and reduced to practice a software and/or hardware facility for executing an input method editor outside of the process of the application that receives its input ("the facility").

In some examples, the IME executes in an input service process—either on the same computer system as the application or a different computer system—and stores the text it generates in a proxy for the application's document within the input service process called an edit buffer. A text input server executing in the input service process and a text input client executing in the application process communicate to keep the edit buffer synchronized with an edit control through which the application receives the input generated by the IME.

In some examples, the facility updates the edit buffer whenever text is added, removed, or changed by IME, and commonly when text is added, removed, or changed by the edit control or the application.

In some examples, to constrain the amount of storage occupied by the edit buffer and the amount of inter-process communication that occurs between the input service process and the application process, the facility maintains incomplete contents of the edit control in the edit buffer. To do so, the text input client maintains an edit buffer cache tracker in the application process to track which portions of the text in the edit control are cached in the edit buffer. When the IME changes the insertion point or text selection range, the text input server notifies the text input client, and the text input client checks the edit buffer cache tracker to determine whether a region surrounding the new insertion point/selection is cached by the edit buffer; if not, the text input client sends this portion to the text input server for storage in the edit buffer, and updates the edit buffer cache tracker. If the edit buffer grows too large, the text input server deletes text (1) furthest from current selection and (2) least recently modified, and notifies the text input client to update the edit buffer cache tracker.

In some examples, the facility synchronizes the contents of the edit buffer with the contents of the text input control in a way that resolves collisions between simultaneous changes by both entities. In particular, in some examples, the facility prioritizes the contents of the text input control by reversing changes in the edit buffer that collide with changes in the text input control. In order to do so, the facility tracks the changes that have been made to the edit buffer, but not confirmed by the text input server as having been made to the text input control, as well as the key actions that resulted in those changes. When a collision is detected, the facility reverses these outstanding changes in the edit buffer, then replays the corresponding key actions in the context of the edit buffer as updated based on the application-side changes.

In an example, the IME produces a sequence of four characters. The first three characters together trigger an autocorrect or autoformat action by the text input control or the application. When the revision is performed in the text input control in response to the first three characters of the sequence, the text input client (1) omits to acknowledge the fourth character of the IME's sequence; (2) sends a text change operation to the text input server to modify the first three characters of the IME's sequence in the edit buffer. Because the text input server receives the text change operation from the text input client before acknowledgement of the fourth character of the IME's sequence, it undoes the addition of the fourth character to the edit buffer, then applies the text change operation, then replays the fourth character in the context of the application's text change operation.

In some examples, the application process and the input service execute on the same computer system. In some examples, the application process and the input service process execute on the different computer systems. For example, the input service process may execute on the user's computer system, while the application process executes on a cloud server. As another example, the application process may execute on a first user's computer system, and input service processes may execute both on the first user's computer system and a second, collaborating user's computer system.

By behaving in some or all of the ways described above, the facility frees the application process of the burdens of executing the IME; eliminates the security risk of running one software vendor's IME in another software vendor's application; and permits the execution of the application and the IME on different computer systems.

FIG. 1 is a block diagram showing some of the components that may be incorporated in at least some of the computer systems and other devices on which the facility operates. In various examples, these computer systems and other devices 100 can include server computer systems, desktop computer systems, laptop computer systems, tablet computer systems, netbooks, mobile phones, personal digital assistants, televisions, cameras, automobile computers, electronic media players, electronic kiosk devices, electronic table devices, electronic whiteboard devices, etc. In various examples, the computer systems and devices may include any number of the following: a central processing unit ("CPU") 101 for executing computer programs; a computer memory 102 for storing programs and data while they are being used, including the facility and associated data, an operating system including a kernel and device drivers, and one or more applications; a persistent storage device 103, such as a hard drive or flash drive for persistently storing programs and data; a computer-readable media drive 104, such as a floppy, CD-ROM, or DVD drive, for reading programs and data stored on a computer-readable medium; and/or a communications subsystem 105 for connecting the computer system to other computer systems and/or other devices to send and/or receive data, such as via the Internet or another wired or wireless network and its networking hardware, such as switches, routers, repeaters, electrical cables and optical fibers, light emitters and receivers, radio transmitters and receivers, and the like.

Figure 2:
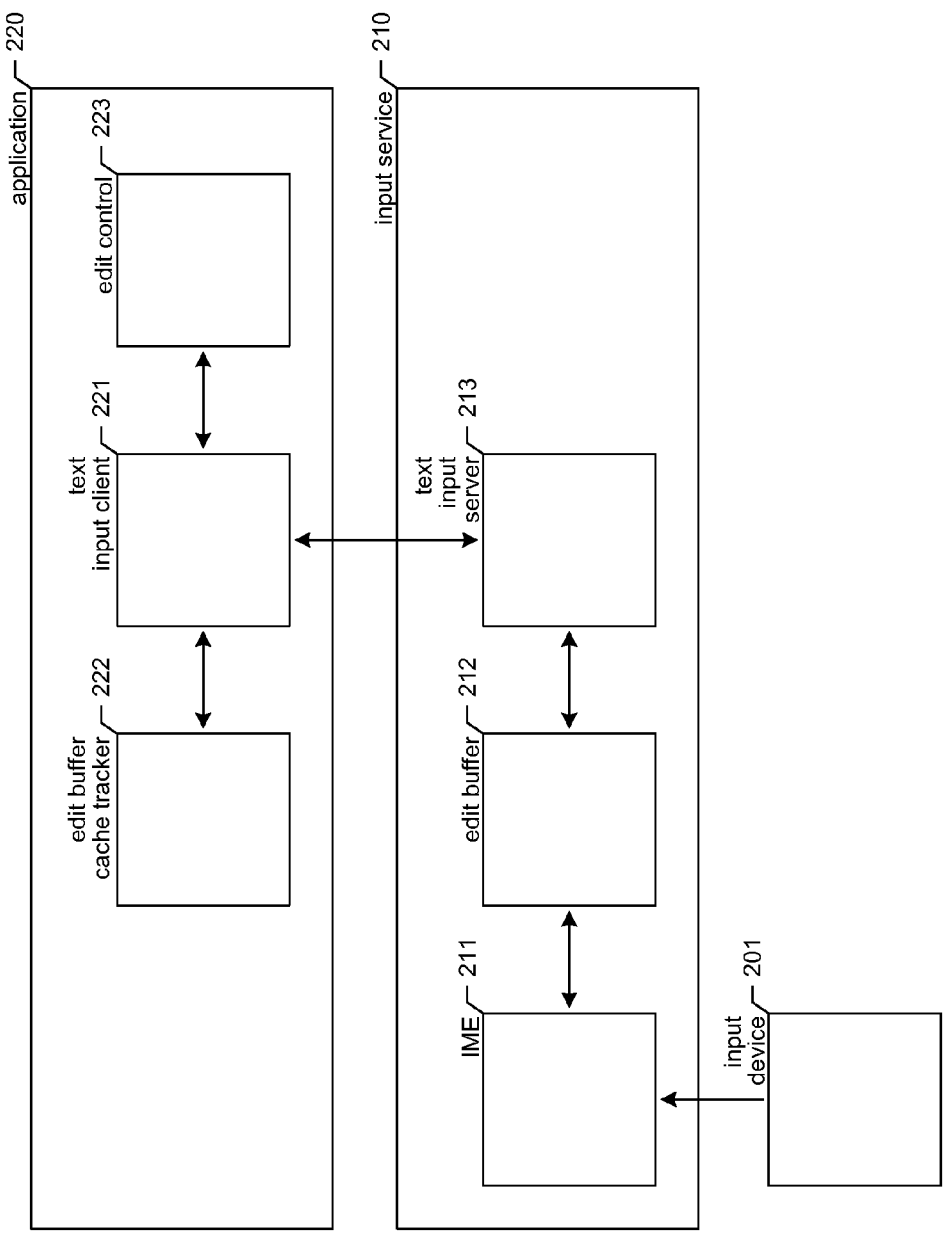
FIG. 2 is a data flow diagram depicting operation of the facility in some examples.

FIG. 2 is a data flow diagram depicting operation of the facility in some examples. Overall, FIG. 2 shows how text input generated by an input device 201 is conveyed to an application via its edit control 223.

The input device receives user input specifying text. In various examples, a physical keyboard receives input representing keypresses; a touch digitizer receives input representing touches and/or swipes on an on-screen keyboard; a microphone or other sound input device receives input representing audible speech; a camera or other image sensor receives input representing communication via American Sign Language, lipreading, or another visual communication system; etc.

An IME 211 executing in an input service process 210 receives text-specifying input from the input device and transforms this input into a stream of characters. The IME communicates the sequence of characters to an edit buffer 212 also executing in the input service process. In some examples, the edit buffer is implemented to interact with the IME in the way that an application's edit control interacts with an IME, such that IMEs can be used with the facility that were designed to interact with edit controls directly.

Characters that are communicated to the edit buffer by the IME are inserted in the edit buffer at a current insertion point. In some cases, characters are communicated to the edit buffer by the IME at a time when both the edit buffer and the edit control are empty. In such cases, a text input server 213 communicates with a text input client 221 in the application process 220 to synchronize the characters inserted in the edit buffer into the edit control. On the other hand, characters may also be communicated to the edit buffer by the IME at a time when both the edit buffer and the edit control contain synchronized text. This can happen, for example, as a result of any combination of the edit buffer earlier receiving text from the IME; text being loaded into the edit control by the application, such as from a document or other file; and the application altering the text in the edit control, such as to perform an autocorrect or autoformat action, reflect an edit by a collaborating user, etc.

In some examples, the edit buffer stores an incomplete version of the text contained in the edit control. The text input client uses an edit buffer cache tracker data structure 222 to track the portions of the text in the edit control that are present in the edit buffer. Each time the user selects a new range of text or an insertion point, the facility causes the text in the edit control that surrounds that range of text or insertion point to be loaded into the edit buffer—unless this text is already stored in the edit buffer—and the edit buffer cache tracker is updated. If the edit buffer grows too large, then the facility chooses text within the edit buffer to discard, again updating the edit buffer cache tracker. In some examples, the process for choosing the text to discard favors discarding text that is far from the current selection or insertion point, and that has not been modified recently.

As discussed above, it is possible for the IME and the application to simultaneously try to change the text that is synchronized between the edit control and the edit buffer. When this happens, the facility gives precedence to changes by the application; it reverses the conflicting changes by the IME, gives effect to the changes by the application in both the edit control and in the edit buffer, replays the key events which originally generated the reversed changes, allowing the IME to update the edit buffer using its new state, and then propagates the new edit buffer changes to the edit control. Additional details about this collision resolution appear below.

FIGS. 3-6 discussed below show processing logic employed by the facility in various of its components in some examples, while FIG. 7 discussed below shows an example of interactions between the facility's text input server and its text input client.

Figure 3:
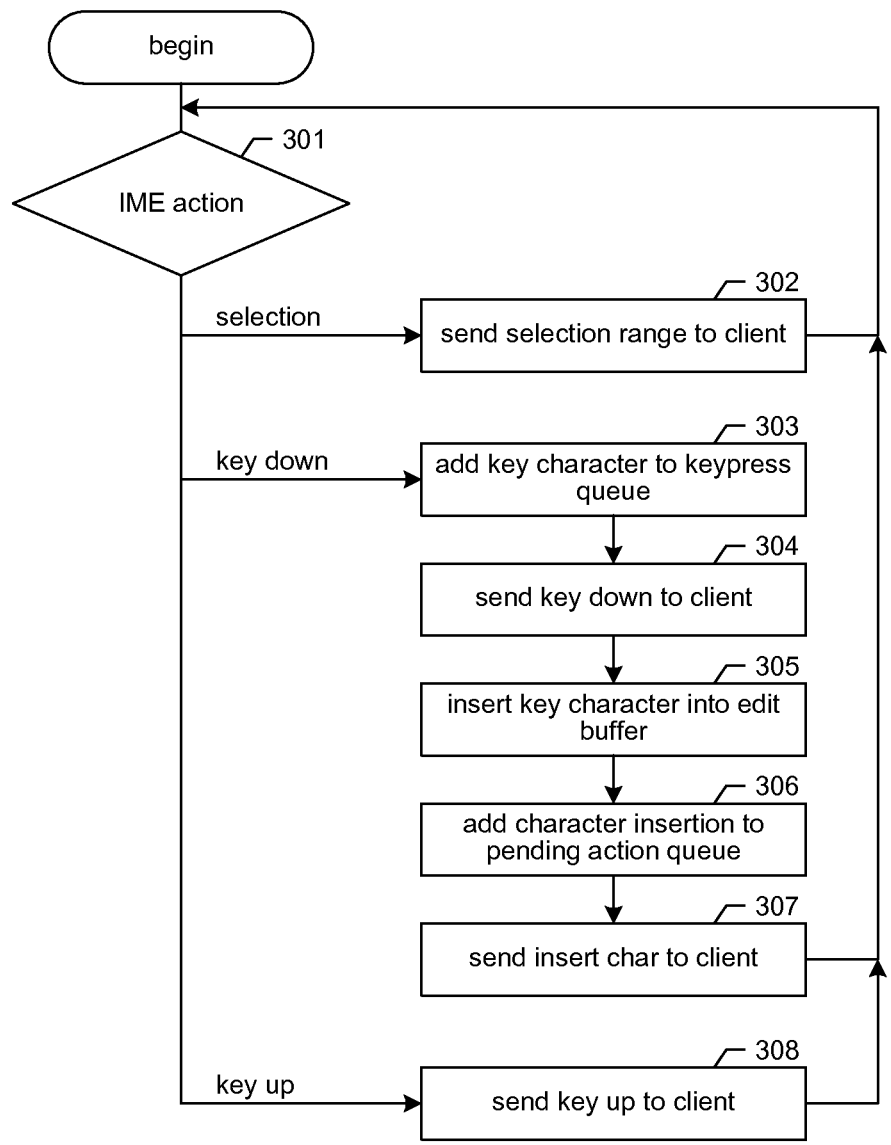
FIG. 3 is a flow diagram showing example acts that may be performed by the facility in some examples to process IME actions received by the text input server.

FIG. 3 is a flow diagram showing example acts that may be performed by the facility in some examples to process IME actions received by the text input server. At 301, the facility branches on the type of IME action received: for selection actions, the facility continues at 302; for key down actions, the facility continues at 303; for key up actions, the facility continues at 308.

At 302, where the IME action is a selection action, the facility sends the selection range or insertion point specified by the IME to the text input client. After 302, the facility continues at 301 to process the next IME action.

At 303, where the IME action is a key down action, the facility adds the key character specified by the IME in the key down action to a keypress queue, from which that key character can be replayed if the corresponding insertion of the character into the edit buffer needs to be reversed. At 304, the facility sends a key down action to the text input client, the processing of which is discussed below in connection with FIG. 6. At 305, the facility inserts the key character specified by the key down action into the edit buffer at the current insertion point. At 306, the facility adds the character insertion action performed at 305 to a pending action queue, from which the action can be reversed in the event of a collision with an application change. At 307, the facility sends an insert char action to the text input client. After 307, the facility continues at 301 to process the next IME action.

At 308, where the IME action is a key up action, the facility sends the key up action to the text input client. After 308, the facility continues at 301 to process the next IME action.

Those skilled in the art will appreciate that the acts shown in FIG. 3 and in each of the flow diagrams discussed below may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

Figure 4:
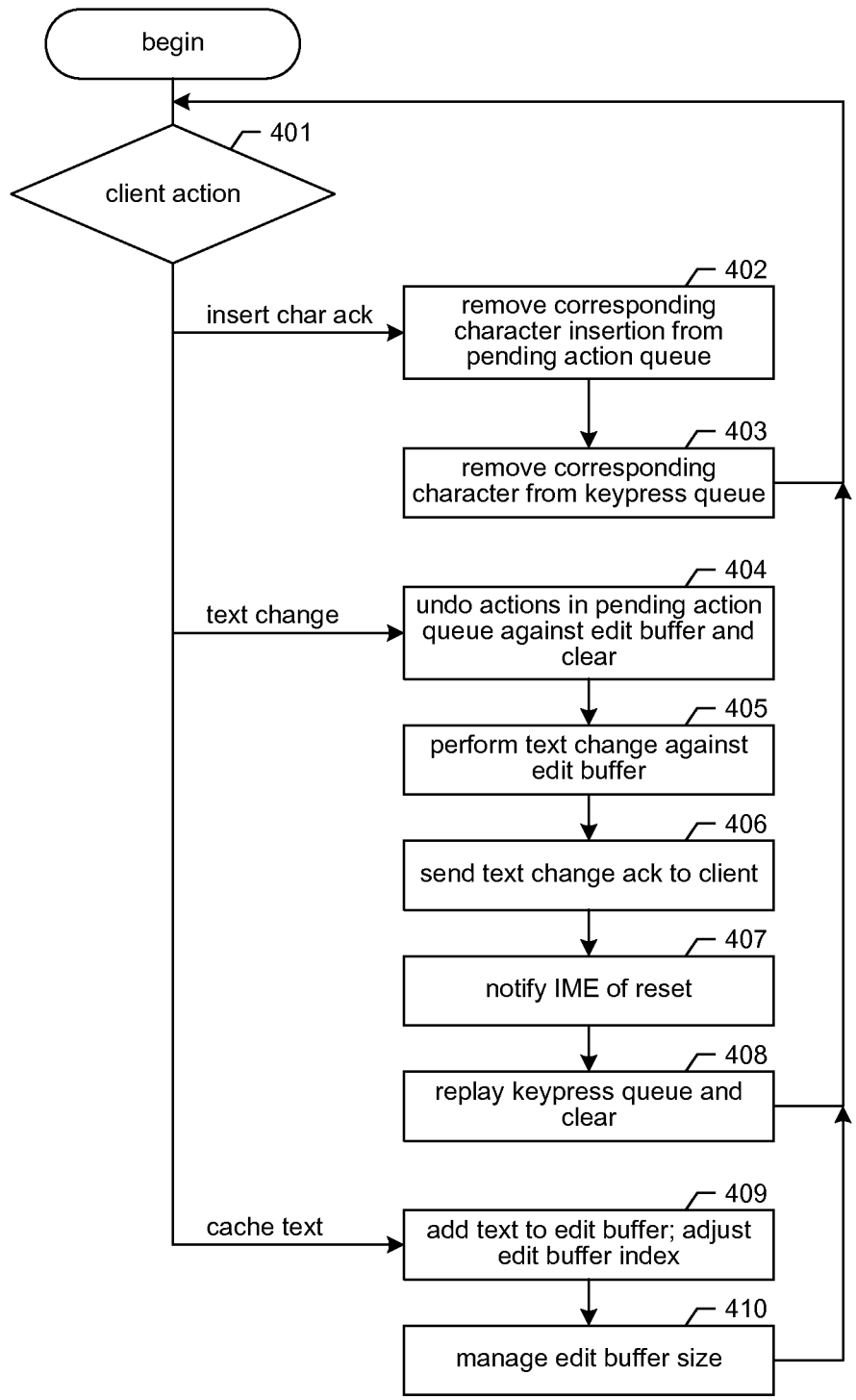
FIG. 4 is a flow diagram showing example acts that may be performed by the facility in some examples to process text input client actions received by the text input server.

FIG. 4 is a flow diagram showing example acts that may be performed by the facility in some examples to process text input client actions received by the text input server. At 401, the facility branches on the type of text input client action received: for insert char ack actions, the facility continues at 402; for text change actions, the facility continues at 404; for cache text actions, the facility continues at 409.

At 402, where the text input client action is an insert char ack action, the facility removes the corresponding character insertion action from the text input server's pending action queue.

At 403, the facility removes the corresponding character from the keypress queue. After 403, the facility continues at 401 to process the next text input client action.

At 404, where the text input client action is a text change action, the facility reverses within the edit buffer any actions in the pending action queue, and clears the pending action queue. At 405, the facility performs the text change action against the edit buffer. At 406, the facility sends a text change ack to the text input client. At 407, the facility notifies the IME that it's context has been reset. At 408, the facility replays the keystrokes in the keypress queue, and clears the keypress queue. After 408 the facility continues at 401 to process the next text input client action.

At 409, where the text input client action is a cache text action, the facility adds text specified by the cache text action to the edit buffer, and adjusts the index that the facility maintains on the edit buffer. In some embodiments, this index is under the control of the edit buffer. Where used by the facility, the edit buffer index identifies the portions of the text in the edit control that are stored in the edit buffer, and the positions in the edit buffer in which they are stored. At 410, the facility manages the size of the edit buffer by removing text from the edit buffer if the edit buffer has exceeded its maximum size. The facility's behavior at 410 is discussed in greater detail below in connection with FIG. 5. After 410 the facility continues at 401 to process the next text input client action.

Figure 5:
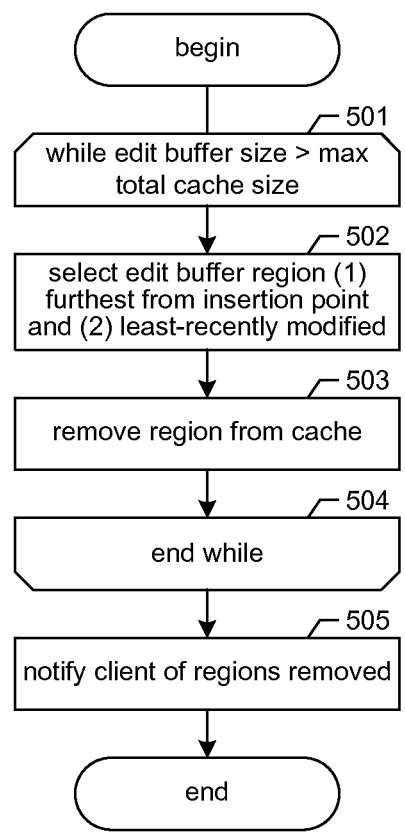
FIG. 5 is a flow diagram showing example acts that may be performed by the facility in some examples to manage the size of the edit buffer.

FIG. 5 is a flow diagram showing example acts that may be performed by the facility in some examples to manage the size of the edit buffer. The facility loops through acts 501-504 while the size of the edit buffer exceeds the maximum total cache size. In some examples, the facility uses a maximum total cache size of 200,000 characters. At 502, the facility selects an edit buffer region for deletion from the edit buffer. In some examples, the facility selects an edit buffer region that is both distant from the current insertion point and has not been modified recently. In some examples this involves: dividing the text in the edit buffer into regions; ranking each region by its distance from the insertion point; ranking each region by the time since it was last modified; summing each region's ranks; adding a value such as 2 to the sum for each region that contains text entered by the user; and selecting the region that has the smallest final result and does not contain a current insertion point. At 503, the facility removes this region selected at 502 from the edit buffer. At 504, if the edit buffer size is still larger than the maximum total cache size, then the facility continues at 501 to select another region of the edit buffer for deletion, else the facility continues at 505. At 505, the facility notifies the text input client of the regions removed so that the text input client can update the edit buffer cache tracker.

Figure 6:
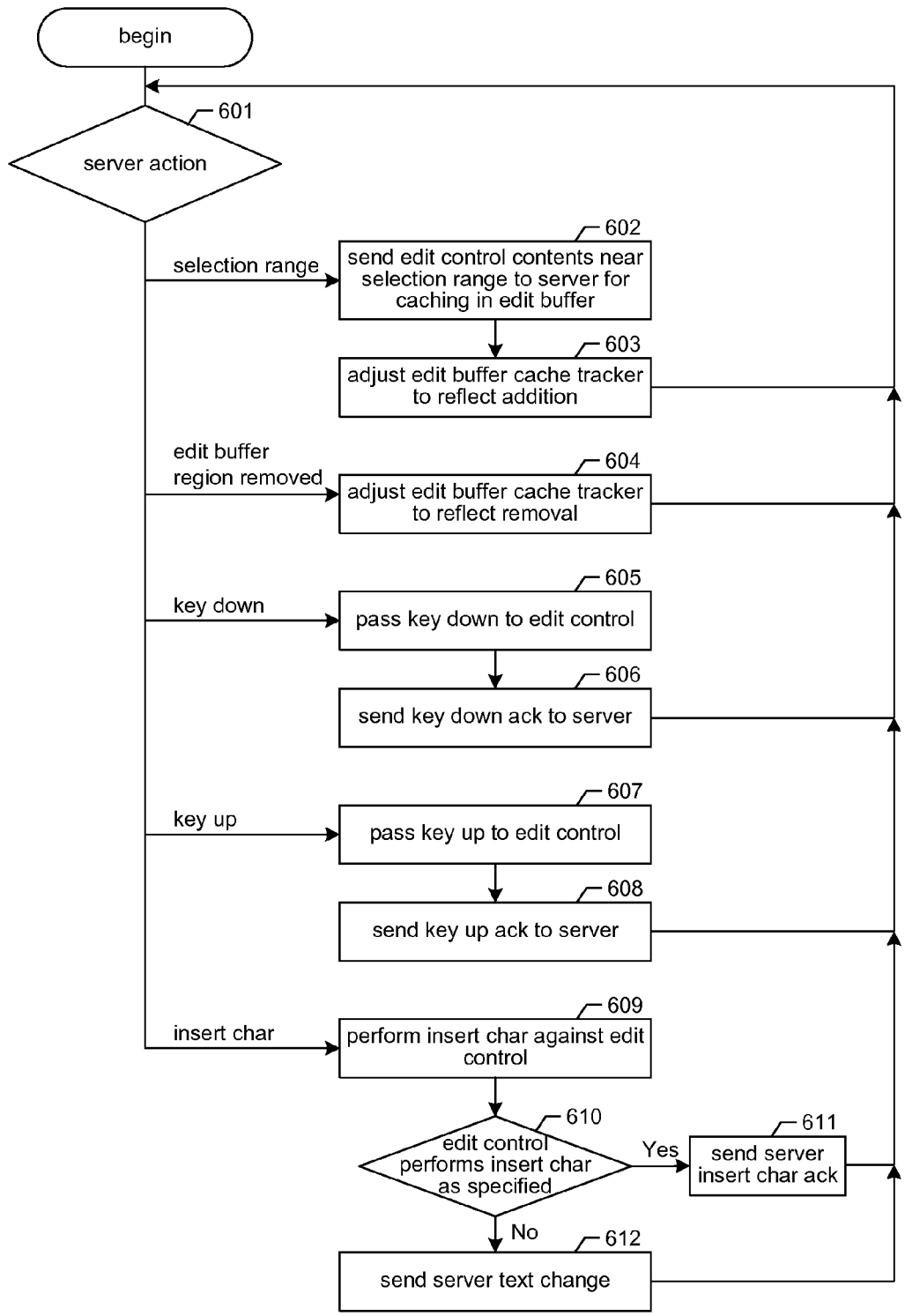
FIG. 6 is a flow diagram showing example acts that may be performed by the facility in some examples to process text input server actions received by the text input client.

FIG. 6 is a flow diagram showing example acts that may be performed by the facility in some examples to process text input server actions received by the text input client. At 601, the facility branches on the type of text input server action received: for selection range actions, the facility continues at 602; for edit buffer region removed actions, the facility continues at 604; for key down actions, the facility continues at 605; for key up actions, the facility continues at 607; for insert char actions, the facility continues at 609.

At 602, where the text input server action is a selection range action, the facility sends contents of the edit control near the selection range specified by the action to the text input server for caching in the edit buffer. In some examples, the facility sends 10,000 characters on either side of the selection range (or insertion point). In some examples, the facility also sends the entire selection range. In some embodiments, the facility sends only a portion of large selection ranges, such as 50 characters at each end of the selection range. At 603, the facility adjusts the edit buffer cache tracker to reflect the addition of the sent text to the edit buffer. After 603, the facility continues at 601 to process the next text input server action.

At 604, where the text input server action is an edit buffer region removed action, the facility adjusts the edit buffer cache tracker to reflect the removal of the specified text from the edit buffer. After 604, the facility continues at 601 to process the next text input server action.

At 605, where the text input server action is a key down action, the facility passes the key down action to the edit control. At 606, the facility sends a key down acknowledgment to the text input server. After 606, the facility continues at 601 to process the next text input server action.

At 607, where the text input server action is a key up action, the facility passes the key up action to the edit control. At 608, the facility sends a key up acknowledgment to the text input server. After 608, the facility continues at 601 to process the next text input server action.

At 609, with a text input server action is an insert char action, the facility performs the insert char action against the edit control to insert the character it specifies. At 610, if the edit control performs the specified insert char action, then the facility continues at 611, else the facility continues at 612. At 611, the facility sends to the text input server an insert char acknowledgment. After 611, the facility continues at 601 to process the next text input server action. At 612, the facility sends the text input server a text change action as part of an override scenario, in which nothing is inserted, or in which one or more characters other than the specified character is inserted. After 612, the facility continues at 601 to process the next text input server action.

Figure 7:
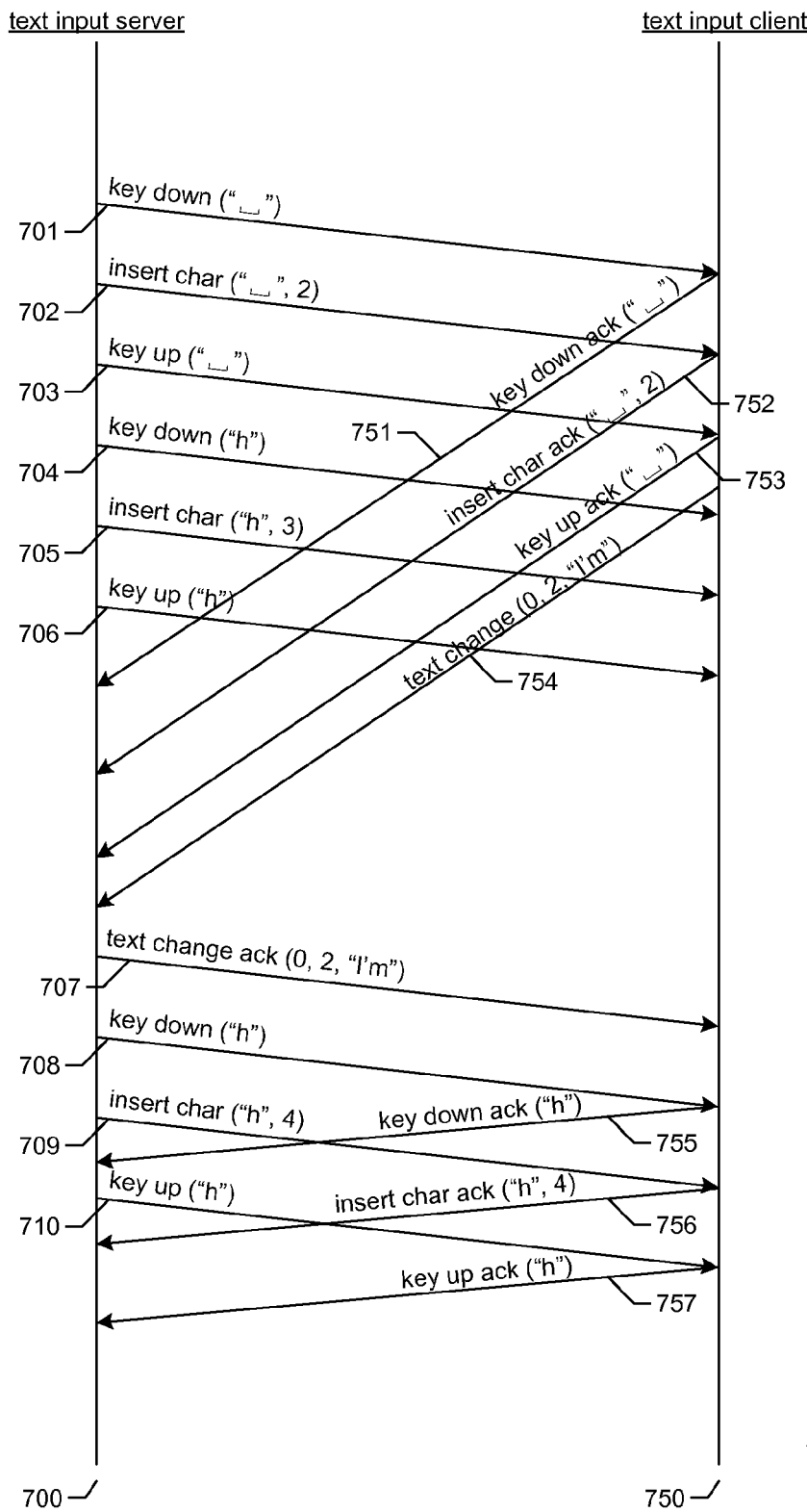
FIG. 7 is a communication diagram showing an example of interactions between the facility's text input server and its text input client.

FIG. 7 is a communication diagram showing an example of interactions between the facility's text input server and its text input client. Communications that move from left to right are sent from the text input server 700 in the input service process to the text input client 750 in the application process. Communications that move from right to left are sent from the text input client to the text input server. In various examples, the facility uses various interprocess and/or inter-machine communication mechanisms to exchange the communications shown in FIG. 7.

Before the first communication 701 is sent, the state of the facility is as shown below in Table 1.

TABLE 1

| edit buffer: | im |
|---|---|
| pending action queue: | |
| keypress queue | |
| edit control: | im |

In response the IME generating a space character, the text server augments edit buffer, pending action queue, and keypress queue as shown below in Table 2.

TABLE 2

| edit buffer: | im ␣ |
|---|---|
| pending action queue: | insert char (" ␣ ", 2) |
| keypress queue | ␣ |
| edit control: | im |

Further in response to the IME generating a space character, the text input server sends the text input client a key down communication 701 for the space character, an insert char communication 702 for the space character, and a key up communication 703 for the space character. In response to the insert char communication, the text input client updates the edit control to add the space as shown below in Table 3.

TABLE 3

| edit buffer: | im ␣ |
|---|---|
| pending action queue: | insert char (" ␣ ", 2) |
| keypress queue | ␣ |
| edit control: | im ␣ |

The text input client also acknowledges key down communication 701 with a key down acknowledgment 751, the insert char communication 702 with an insert char acknowledgment 752, and the key up communication 703 with a key up acknowledgment 753. In response to the insert char acknowledgment, the text input server removes the space insertion from the pending action queue, and the space character from the keypress queue as shown below in Table 4.

TABLE 4

| edit buffer: | im ␣ |
|---|---|
| pending action queue: | |
| keypress queue | |
| edit control: | im ␣ |

In processing the insert char action, the application performs an auto correct operation to the text in the edit control as reflected in Table 5 below, transforming "im" into "I'm".

TABLE 5

| edit buffer: | im ␣ |
|---|---|
| pending action queue: | |
| keypress queue | |
| edit control: | I'm ␣ |

While the application was performing the auto correct operation, the text input server received the next character, "h", outputted by the IME. In response to receiving the "h" character, the text input server updated the edit buffer, pending action queue, and keypress queue as shown below in Table 6.

TABLE 6

| edit buffer: | im ␣ h |
|---|---|
| pending action queue: | insert char ("h", 3) |
| keypress queue | h |
| edit control: | I'm ␣ |

Further in response to the IME generating the "h" character, the text input server sent key down, insert char, and key up communications 704-706 for the "h" character.

Because of the auto correct operation by the application in response to the insert char communication for the space character, rather than responding to communications 704-706 regarding the "h" character, the text input client instead sends a text change communication 754 that specifies replacing the characters from position 0 through position 2 in the edit buffer ("im") with "I'm".

In response, the text input server proceed as follows: First, the text input server reverses the actions shown in the pending action queue against the edit buffer as shown below in Table 7.

TABLE 7

| | |
|---|---|
| edit buffer: | im ↵ |
| pending action queue: | |
| keypress queue | h |
| edit control: | I'm ↵ |

Then, the text input server applies the text change action in communication 752, as shown below in Table 8.

TABLE 8

| | |
|---|---|
| edit buffer: | I'm ↵ |
| pending action queue: | |
| keypress queue | h |
| edit control: | I'm ↵ |

The text input server then sends a text change acknowledgment communication 707, and replays the characters in the keypress queue against the current state of the edit buffer as shown below in Table 9. Replaying the keypress queue adds an insert char action to the pending action queue. The insert char action remains in the pending action queue and the "h" character remains in the keypress queue until the text input client acknowledges an insert char communication from the text input server for the "h" character.

TABLE 9

| | |
|---|---|
| edit buffer: | I'm ↵ h |
| pending action queue: | insert char ("h", 4) |
| keypress queue | h |
| edit control: | I'm ↵ |

As part of the replaying, text input server sends the text input client key down, insert char, and key up communications 708-710 for the "h" character. In response to the insert char communication, the text input client updates the edit control to add the "h" character as shown below in Table 10. The insertion action for the "h" character stays in the pending action queue, and the "h" character stays in the keypress queue until the insert char action for the "h" character is acknowledged by the text input client.

TABLE 10

| | |
|---|---|
| edit buffer: | I'm ↵ h |
| pending action queue: | insert char ("h", 4) |
| keypress queue | h |
| edit control: | I'm ↵ h |

Finally, the text input client sends acknowledgments 755-757 for the key down, insert char, and key up actions for the "h" character. In response to the insert char acknowledgment, the text input server clears the pending action queue and keypress queue as shown below in Table 11.

TABLE 11

| | |
|---|---|
| edit buffer: | I'm ↵ h |
| pending action queue: | |
| keypress queue | |
| edit control: | I'm ↵ h |

Those skilled in the art will appreciate that the communications shown in FIG. 7 may be altered in a variety of ways. For example, communications may be performed in different orders; different communication types can be substituted for the communication types shown; more or fewer communication types can be used; a shown communication can be divided into sub-communications, or multiple shown communications may be combined into a single communication; etc.

In some examples, the facility provides a computing system for providing textual output of an input method editor to an application. The computing system comprises: a first memory region configured to store a version of a body of text to which textual output of the input method editor is applied; a second memory region configured to store a version of a body of text to which text modifications performed by the application are applied; and a reconciliation subsystem configured to reconcile the contents of the first and second memory regions in a manner that favors the contents of the second memory region.

In some examples, the facility provides a computer-readable medium having contents configured to cause a computing system to, in order to process textual input generated with a user input device: store the textual input in a first data structure contained in the address space of a first process; and synchronize contents of the first data structure to a second data structure contained in the address space of a second process distinct from the first process, an application executing in the second process being configured to consume textual input synchronized to the second data structure.

In some examples, the facility provides a computer-readable medium storing a tech synchronization data structure relating to a first buffer to which both (1) textual user input and (2) application text changes synchronized from a second buffer have been applied. The data structure comprises: one or more first entries each containing information identifying an editing action that (a) has been applied to the first buffer in response to textual user input, (b) has been communicated to the second buffer, and (c) has not been acknowledged by the second buffer, such that the contents of the first entries are usable to reverse editing actions that have been applied to the first buffer and are incompatible with application text changes to the second buffer.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computing system for providing textual output of an input method editor to an application, the computing system comprising:
   a first memory region that stores a first version of a body of text to which textual output of the input method editor is applied;
   a second memory region that stores a second version of a body of text to which text modifications performed by the application are applied; and
   a reconciliation subsystem configured to reconcile the contents of the first and second memory regions in a manner that favors the contents of the second memory region, including:
   reversing edits made by the input method editor to text stored in the first memory region; and
   applying text modifications performed by the application to the text stored in the first memory region.

2. The computing system of claim 1 wherein the first and second memory regions are in different memory devices directly connected to different computer systems.

3. The computing system of claim 1 wherein the first and second memory regions are in one or more memory devices all directly connected to the same computer system.

4. The computing system of claim 1, the reconciliation subsystem further configured to only reconcile to the second memory region contents of the first memory region that reflect textual output outputted by the input method editor since the most recent text modifications were performed by the application.

5. The computing system of claim 4, the reconciliation subsystem further configured to acknowledge contents of the first memory region reconciled to the second memory region,
the computing system further comprising a third memory region that stores indications of textual output of the input method editor that has been applied to the version of the body of text stored in the first memory region and not acknowledged as reconciled to the second memory region,
the reconciliation subsystem further configured to, where textual output of the input method editor has been applied to the contents of the first memory region before applying text modifications that were earlier performed by the application:
reverse application to the contents of the first memory region of textual output of the input method editor whose indications are stored in the third memory region to reverse the edits made by the input method editor;
after the reversing, apply to the content of the first memory region the text modifications that were earlier performed by the application'; and
clear the indications stored in the third memory region.

6. The computing system of claim 5, the reconciliation subsystem further configured to, where textual output of the input method editor has been applied to the contents of the first memory region before applying text modifications that were earlier performed by the application:
after the application to the content of the first memory region the text modifications that were earlier performed by the application, apply to the contents of the first memory region textual output of the input method editor whose indications are generated anew from the user input actions stored in a fourth memory region; and
clear the indications stored in the fourth memory region.

7. The computing system of claim 5, the reconciliation subsystem further configured to, when reconciliation is stable, cause the first memory region to contain a proper subset of the contents of the second memory region.

8. The computing system of claim 1, wherein reconciling the contents of the first and second memory regions in a manner that favors the contents of the second memory region includes changing content of the first memory to contain content in the first memory.

9. A non-transitory computer-readable storage medium having contents configured to cause a computing system to, in order to process textual input generated with a user input device:
store the textual input in a first data structure contained in the address space of a first process; and
synchronize contents of the first data structure to a second data structure contained in the address space of a second process distinct from the first process, an application executing in the second process being configured to apply textual input to the second data structure,
wherein in response to a collision between synchronizing contents of the first data structure to the second data structure and synchronizing contents of the second data structure to the first data structure:
reversing application of colliding textual input made by the first process to the first data structure; and
applying textual input made by the application to the first data structure.

10. The non-transitory computer-readable storage medium of claim 9 having contents configured to further cause a computing system to synchronize to the first data structure contents of the second data structure reflecting text modifications performed by the application.

11. The non-transitory computer-readable storage medium of claim 10 wherein only a portion of the contents of the second data structure is synchronized to the first data structure.

12. The non-transitory computer-readable storage medium of claim 9 having contents configured to further cause a computing system to, in further response to a collision between synchronizing contents of the first data structure to the second data structure and synchronizing contents of the second data structure to the first data structure:
in response to repetition of application to the first data structure of colliding textual input, synchronize contents of the first data structure to the second data structure.

13. The non-transitory computer-readable storage medium of claim 9 having contents configured to further cause a computing system to:
determine that the user input device has been used to select text corresponding to a distinguished range of text in the second data structure; and
in response to determining that the user input device has been used to select text corresponding to the distinguished range of text in the second data structure, synchronize from the second data structure to the first data structure a range of text surrounding the distinguished range of text in the second data structure.

14. The non-transitory computer-readable storage medium of claim 13 having contents configured to further cause a computing system to:
in response to synchronizing from the second data structure to the first data structure a range of text surrounding the distinguished range of text in the second data structure, update a third data structure that tracks portions of the second data structure stored in the first data structure to reflect the synchronization.

15. The non-transitory computer-readable storage medium of claim 9 having contents configured to further cause a computing system to:
determine that the first data structure exceeds a size threshold;
in response to determining that the first data structure exceeds the size threshold:
identify contents of the first data structure that are distant from an insertion point and have not been recently modified; and
delete the identified contents from the first data structure.

16. The non-transitory computer-readable storage medium of claim 15 having contents configured to further cause a computing system to:
in response to deleting the identified contents from the first data structure, update a third data structure that tracks portions of the second data structure stored in the first data structure to reflect the deletion.

17. A non-transitory computer-readable storage medium storing a text synchronization data structure relating to a first buffer, (1) textual user input having been applied to the first buffer, and (2) application text changes synchronized from a second buffer having been applied to the first buffer, the data structure comprising:

one or more first entries, each first entry containing information identifying an editing action that (a) has been applied to the first buffer in response to textual user input, (b) has been communicated to the second buffer, and (c) has not been acknowledged by the second buffer, such that the contents of the first entries are usable to reverse editing actions that have been applied to the first buffer and are incompatible with application text changes to the second buffer.

18. The non-transitory computer-readable storage medium of claim 17, further comprising: one or more second entries, each second entry containing information identifying a character received as textual user input corresponding to an editing action identified by the information contained by a first entry, such that the content of the second entries are usable to replay to the first buffer the textual user input characters whose editing actions are incompatible with application text changes to the second buffer in response to reconciliation to the first buffer of the application text changes to the second buffer.

* * * * *